US010637045B2

(12) United States Patent
Woehrle et al.

(10) Patent No.: US 10,637,045 B2
(45) Date of Patent: Apr. 28, 2020

(54) COMPOSITE ELECTRODE AND LITHIUM-ION BATTERY COMPRISING SAME AND METHOD FOR PRODUCING THE COMPOSITE ELECTRODE

(71) Applicant: Bayerische Motoren Werke Aktiengesellschaft, Munich (DE)

(72) Inventors: Thomas Woehrle, Munich (DE); Matthias Tschech, Munich (DE); Thomas Hoefler, Groebenzell (DE); Sung-Jin Kim, Munich (DE); Sebastian Scharner, Tuerkenfeld (DE); Jens Vetter, Hebertshausen (DE); Jan-Oliver Roth, Erding (DE); Tobias Zeilinger, Munich (DE); Matthias Wagner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 144 days.

(21) Appl. No.: 15/654,008

(22) Filed: Jul. 19, 2017

(65) Prior Publication Data

US 2017/0317338 A1 Nov. 2, 2017

Related U.S. Application Data

(63) Continuation of application No. PCT/EP2016/050994, filed on Jan. 19, 2016.

(30) Foreign Application Priority Data

Jan. 20, 2015 (DE) ........................ 10 2015 200 758

(51) Int. Cl.
*H01M 4/36* (2006.01)
*H01M 4/04* (2006.01)
*H01M 4/139* (2010.01)
*H01M 10/0525* (2010.01)
*H01G 11/32* (2013.01)
*H01G 11/30* (2013.01)
*H01G 11/28* (2013.01)
*H01G 11/50* (2013.01)
*H01M 4/66* (2006.01)
*H01M 4/02* (2006.01)

(52) U.S. Cl.
CPC ............ *H01M 4/362* (2013.01); *H01G 11/28* (2013.01); *H01G 11/30* (2013.01); *H01G 11/32* (2013.01); *H01G 11/50* (2013.01); *H01M 4/0402* (2013.01); *H01M 4/0404* (2013.01); *H01M 4/0435* (2013.01); *H01M 4/0471* (2013.01); *H01M 4/139* (2013.01); *H01M 4/366* (2013.01); *H01M 4/66* (2013.01); *H01M 10/0525* (2013.01); *H01M 2004/021* (2013.01)

(58) Field of Classification Search
CPC .. H01M 4/362; H01M 4/0402; H01M 4/0404; H01M 4/0435; H01M 4/0471; H01M 4/139; H01M 4/366; H01M 4/66; H01M 10/0525; H01G 11/28; H01G 11/30; H01G 11/32; H01G 11/50
USPC ........................................................ 429/217
See application file for complete search history.

(56) References Cited

U.S. PATENT DOCUMENTS

| 4,008,523 A | 2/1977 | von Voros |
| 5,872,358 A | 2/1999 | Todokoro et al. |
| 6,677,082 B2 | 1/2004 | Thackeray et al. |
| 6,680,143 B2 | 1/2004 | Thackeray et al. |
| 7,205,072 B2 | 4/2007 | Kang et al. |
| 2003/0099884 A1 | 5/2003 | Chiang et al. |
| 2006/0251965 A1* | 11/2006 | Nagayama ............ H01M 2/021 429/209 |
| 2011/0217594 A1* | 9/2011 | Awano .................. H01M 4/131 429/232 |
| 2011/0281166 A1* | 11/2011 | Cho ..................... H01M 4/0404 429/221 |

(Continued)

FOREIGN PATENT DOCUMENTS

| DE | 10 2011 114 613 A1 | 4/2013 |
| DE | 10 2013 204 872 A1 | 9/2014 |

(Continued)

OTHER PUBLICATIONS

International Search Report (PCT/ISA/210) issued in PCT Application No. PCT/EP2016/050994 dated Mar. 23, 2016 with English translation (seven pages).

(Continued)

*Primary Examiner* — Amanda C. Walke
(74) *Attorney, Agent, or Firm* — Crowell & Moring LLP

(57) ABSTRACT

A composite electrode is provided having a collector, the collector is coated with an electrode composition containing an active electrode material, a binding agent, and a conductivity additive such as conductive carbon black. The electrode composition has a concentration gradient along the direction of the electrode thickness in respect of the active electrode material and the conductivity additive, with the concentration gradient of the active electrode material increasing toward the collector, and the concentration gradient of the conductivity additive and the binder decreasing toward the collector. Two different methods of producing the composite electrode are also provided. A lithium-ion battery is further provided which includes a composite electrode having a collector, the collector is coated with an electrode composition containing an active electrode material, a binding agent, and a conductivity additive.

13 Claims, No Drawings

(56) References Cited

U.S. PATENT DOCUMENTS

| | | | | |
|---|---|---|---|---|
| 2011/0300441 A1* | 12/2011 | Kawakami | ............ | H01M 4/136 |
| | | | | 429/211 |
| 2012/0003535 A1* | 1/2012 | Yamazaki | ............... | H01G 11/06 |
| | | | | 429/218.1 |
| 2012/0115028 A1* | 5/2012 | Ueno | ....................... | H01M 4/13 |
| | | | | 429/209 |
| 2012/0328942 A1 | 12/2012 | Thomas-Alyea et al. | | |
| 2013/0022867 A1 | 1/2013 | Suzuki | | |
| 2014/0287304 A1 | 9/2014 | Netz | | |
| 2015/0340741 A1* | 11/2015 | Kim | .................. | H01M 10/0436 |
| | | | | 29/623.1 |
| 2017/0294657 A1* | 10/2017 | Yamashita | ............ | H01M 4/485 |
| 2018/0261851 A1* | 9/2018 | Huang | .................. | H01M 4/364 |

FOREIGN PATENT DOCUMENTS

| | | |
|---|---|---|
| EP | 1 953 851 A1 | 8/2008 |
| WO | WO 2011/109815 A1 | 9/2011 |

OTHER PUBLICATIONS

German-language Written Opinion (PCT/ISA/237) issued in PCT Application No. PCT/EP2016/050994 dated Mar. 23, 2016 (nine pages).

German Search Report issued in counterpart German Application No. 10 2015 200 758.8 dated Aug. 27, 2015 with partial English translation (14 pages).

Xu et al., "Recent Progress in cathode materials research for advanced lithium ion batteries", Materials Science and Engineering R 73, 2012, pp. 51-65.

W. Weppner et al., "Determination of the Kinetic Parameters of Mixed-Conducting Electrodes and Application to the System $Li_3Sb$", vol. 124, No. 10, pp. 1569-1578, Oct. 1977.

W. Zhang,"A Review of the Electrochemical Performance of Alloy Anodes for Lithium-Ion Batteries", Journal of Power Sources, vol. 196, pp. 13-24, 2011.

J. Brakel, "Mercury Porosimetry: State of the Art", Powder Technology, vol. 29, pp. 1-12, 1981.

\* cited by examiner

US 10,637,045 B2

COMPOSITE ELECTRODE AND LITHIUM-ION BATTERY COMPRISING SAME AND METHOD FOR PRODUCING THE COMPOSITE ELECTRODE

CROSS REFERENCE TO RELATED APPLICATIONS

This application is a continuation of PCT International Application No. PCT/EP2016/050994, filed Jan. 19, 2016, which claims priority under 35 U.S.C. § 119 from German Patent Application No. 10 2015 200 758.8, filed Jan. 20, 2015, the entire disclosures of which are herein expressly incorporated by reference.

BACKGROUND AND SUMMARY OF THE INVENTION

The present invention relates to a composite electrode. The present invention also relates to a lithium-ion battery having such composite electrode, and a method for producing such composite electrode.

As used herein, the terms "lithium-ion battery", "rechargeable lithium-ion battery", and "secondary lithium-ion battery" are used synonymously. These terms also encompass the terms "lithium battery", "lithium-ion accumulator", and "lithium-ion cell", and also all lithium or alloy batteries, including in particular lithium-sulfur, lithium-air or alloy systems. Therefore, the term "lithium-ion battery" is used as a collective term for the aforementioned terms which are customary known in the art. It refers to both rechargeable batteries (secondary batteries) and non-chargeable batteries (primary batteries). In particular, as used herein, a "battery" within the meaning of the present invention also encompasses an individual or single "electrochemical cell".

Generally, as known in the art, the mode of action of a lithium-ion battery can be described as follows: the electrical energy is stored in lithium ions (at the negative electrode) and transition-metal oxides (at the positive electrode) in a chemical process with a change of material. Here, the lithium ions in the ionized form ($Li^+$) can migrate back and forth between the two electrodes through an electrolyte, which contains usually lithium hexafluorophosphate ($LiPF_6$) as the conducting lithium salt. In contrast to the lithium ions, the transition-metal ions present at the cathode are stationary.

This flow of lithium ions is necessary in order to compensate the external flow of electric current during charging and discharging, so that the electrodes themselves remain electrically neutral. During discharging, the effective lithium atoms (or the negative active material containing the lithium ions) at the negative electrode each release an electron, which flows via the external current circuit (load) to the positive electrode. At the same time, the same number of lithium ions migrates through the electrolyte from the negative electrode to the positive electrode. At the positive electrode, however, the lithium ions do not take up the electron again, but instead the transition-metal ions present there take up the electrons. Depending on the type of battery, these ions may be cobalt, nickel, manganese or iron ions, etc. The lithium thus continues to be in ionized form ($Li^+$) at the positive electrode in the discharged state of the cell.

WO 2011/109815 A1 discloses composite electrodes having gradients of a series of chemical, physical and performance properties in the direction of the electrode thickness.

It is an object of the present invention to provide a composite electrode having improved ion conduction and high-current capability in addition to effect adhesion of an electrode composition to a collector.

This and other objects of the invention are achieved by means of a composite electrode in accordance with one or more aspects of the disclosure.

The following definitions apply, where applicable, to all aspects of the disclosure:

Lithium-Ion Battery

As used herein, the term "lithium-ion battery" has the meaning as defined above. In particular, the term also includes an individual or single "electrochemical cell". Preferably, in a "battery", two or more electrochemical cells of this kind are connected, either in series (that is, one after another) or in parallel.

Electrodes

The electrochemical cell of the invention has at least one positive electrode and at least one negative electrode, i.e., a cathode (positive electrode) and an anode (negative electrode).

These two electrodes each have at least one electrochemically active material. This material is capable of accepting or releasing lithium ions and at the same time takes up or releases electrons.

As used herein, the term "positive electrode" refers to the electrode which when the battery is connected to a load, such as to an electric motor, is capable of accepting electrons. In this nomenclature, it represents the cathode.

As used herein, the term "negative electrode" refers to the electrode which in operation is capable of releasing electrons. In this nomenclature, it represents the anode.

The electrodes include inorganic material or inorganic compounds or substances which can be used for or in or on an electrode or as an electrode. Under the operating conditions of the lithium-ion battery, on the basis of their chemical nature, these compounds or substances can take up (intercalate) lithium ions or metallic lithium and also release them. In the present description, a material of this kind is referred to as an "active cathode material" or "active anode material", respectively, or generally, as "active material" or "active electrode material". For use in an electrochemical cell or battery, this active material is preferably applied to a support, preferably to a metallic support, preferably using aluminum for the cathode and copper for the anode, respectively. This support is also referred to as a "collector" or a "current collector" or a "collector foil."

Cathode (the Positive Electrode)

As for selecting the active material for the positive electrode (also referred to as the active cathode material), it is possible to use any active materials which are known in the art. These include, for example, $LiCoO_2$ (LCO), lithium nickel cobalt manganese oxide (NCM), lithium nickel cobalt aluminum oxide (NCA), high-energy NCM (HE-NCM), lithium-iron phosphate, or Li-manganese spinel ($LiMn_2O_4$) or high-voltage spinel such as $LiMn_{1.5}Ni_{0.5}O_4$. According to one aspect of the invention, any suitable active material known in the art can be used for the cathode (the positive electrode).

In one preferred embodiment, the active cathode material may be a material selected from the group consisting of a lithium transition-metal oxide (also referred to as the lithium metal oxide), layered oxides, spinels, olivine compounds, silicate compounds, and mixtures thereof. Such active cathode materials are described for example in Bo Xu et al. "Recent Progress in Cathode Materials Research for Advanced Lithium Ion Batteries", *Materials Science and Engineering* R 73 (2012) 51-65. Preferably, the active cathode material is HE-NCM. Layered oxides and HE-NCM are also described in U.S. Pat. Nos. 6,677,082, 6,680,143, and 7,205,072 of the Argonne National Laboratory.

Examples of olivine compounds are lithium phosphates of empirical formula $LiXPO_4$ where X=Mn, Fe, Co or Ni, or combinations thereof.

Examples of lithium transition-metal oxide, spinel compounds, and layered transition-metal oxides include lithium manganate, preferably $LiMn_2O_4$, lithium cobaltate, preferably $LiCoO_2$, lithium nickelate, preferably $LiNi_{0.8}Co_{0.15}Al_{0.05}O_2$ (NCA), or mixtures of two or more of these oxides, or their mixed oxides thereof.

The active material may also contain mixtures of two or more of the substances described herein.

To increase the electrical conductivity, further compounds (such as conductivity additives) are included in the active material, preferably carbon-containing compounds, or carbon, preferably in the form of conductive carbon black or graphite. The carbon may also be introduced in the form of carbon nanotubes or graphene. Such additions are preferably in an amount of from 0.1 to 6 wt %, more preferably, from 1 to 3 wt %, based on the positive electrode's composition (excluding carrier solvent) applied to the support.

Anode (the Negative Electrode)

As for selecting the active material for the negative electrode (also referred to as the active anode material), it is possible to use any active materials which are known in the art. According to one aspect of the invention, any suitable active material known in the art can be used for the negative electrode (the anode).

The active anode material can be selected from the group consisting of lithium metal oxides, such as lithium titanium oxide, metal oxides (e.g., $Fe_2O_3$, ZnO, $ZnFe_2O_4$), carbon-containing materials, such as graphite (e.g., synthetic graphite, natural graphite), graphene, mesocarbon, doped carbon, hard carbon, soft carbon, mixtures of silicon and carbon, silicon, tin, metallic lithium and materials which can be alloyed with lithium, and mixtures thereof. It is also possible to use niobium pentoxide, tin alloys, titanium dioxide, tin dioxide, silicon or mixtures thereof as the active material for the anode (the negative electrode).

In one embodiment, the active anode material is a material which can be alloyed with lithium. This material may be metallic lithium, a lithium alloy, or an unlithiated or partially lithiated precursor thereof, from which a lithium alloy is produced on formation. Preferred materials which can be alloyed with lithium are lithium alloys selected from the group consisting of silicon-based, tin-based, and antimony-based alloys. Such alloys are described for example in the review article by W. J. Zhang, *Journal of Power Sources*, 196 (2011) 13-24.

Electrode Binder

The materials used for the positive or negative electrode, for example the active materials, are held together by one or more binders which hold these materials on the electrode and/or on the collector.

The binders can be selected from the group consisting of polyvinylidene fluoride (PVdF), polyvinylidene fluoride-hexafluoropropylene copolymer (PVdF-HFP), polyethylene oxide (PEO), polytetrafluoroethylene, polyacrylate, styrene-butadiene rubber, and carboxymethylcellulose (CMC), and mixtures and copolymers thereof. The styrene-butadiene rubber and optionally the carboxymethylcellulose and/or the further binders, such as PVdF, are preferably present in an amount of 0.5-10 wt %, based on the total amount of the active material used in the positive or the negative electrode.

Separator

The electrochemical cell of the invention has a material which separates the positive electrode and the negative electrode from one another. This material is permeable to lithium ions, i.e., conducts lithium ions, but is a nonconductor for electrons. Materials of this kind used in lithium-ion batteries are also referred to as separators.

In one preferred embodiment, polymers are used as separators. In one embodiment, the polymers are selected from the group consisting of: polyesters, preferably polyethylene terephthalate; polyolefin, preferably polyethylene, polypropylene; polyacrylonitrile; polyvinylidene fluoride; polyvinylidene-hexafluoropropylene; polyetherimide; polyimide, polyamide, polyethers; polyetherketone, or mixtures thereof. The separator has porosity, so that it is permeable to lithium ions. In one preferred embodiment, the separator consists of at least one polymer.

Electrolyte

As used herein, the term "electrolyte" refers to a liquid in which a conducting lithium salt such as lithium hexafluorophosphate ($LiPF_6$) is in solution. The liquid is preferably a solvent for the conducting salt. In that case the conducting Li salt is preferably in dissociated form.

Preferably the solvents are chemically and electrochemically inert. Examples of suitable solvents include preferably organic solvents such as, ethylene carbonate, propylene carbonate, dimethyl carbonate, diethyl carbonate, ethyl methyl carbonate, sulfolanes, 2-methyltetrahydrofuran, or 1,3-dioxalane. Preferably, organic carbonates are used as the solvent.

In one aspect of the disclosure, ionic liquids can also be used as solvents. The ionic liquids contain exclusively ions. Examples of cations include those which can be in alkylated form, such as imidazolium, pyridinium, pyrrolidinium, guanidinium, uronium, thiuronium, piperidinium, morpholinium, sulfonium, ammonium, and phosphonium cations. Examples of anions which can be used include halide, tetrafluoroborate, trifluoroacetate, triflate, hexafluorophosphate, phosphinate, and tosylate anions.

Exemplary ionic liquids include the following: N-methyl-N-propylpiperidinium bis(trifluoromethylsulfonyl)imide, N-methyl-N-butylpyrollidinium bis(trifluoromethylsulfonyl)imide, N-butyl-N-trimethylammonium bis(tri-fluoromethylsulfonyl)imide, tri ethyl sulfonium bis(trifluoromethylsulfonyl)imide, and N,N-diethyl-N-methyl-N-(2-methoxyethyl)ammonium bis(trifluoromethylsulfonyl)imide.

Preference is given to using two or more of the liquids described above. Preferred conducting salts are lithium salts which have inert anions and which are preferably nontoxic. Suitable lithium salts are preferably lithium hexafluorophosphate ($LiPF_6$), or lithium tetrafluoroborate ($LiBF_4$), and mixtures of one or more of these salts. In one embodiment, the separator here is wetted or impregnated with the lithium salt electrolyte.

Various objects, advantages and novel features of the present invention will become apparent from the following detailed description of one or more preferred embodiments when considered in conjunction with the accompanying examples.

In one aspect of the disclosure, the present invention is directed to a composite electrode.

The composite electrode of the invention includes a collector, the collector is coated with an electrode composition which contains an active electrode material, a binder, and a conductivity additive. The electrode composition has a concentration gradient along the direction of the electrode thickness in respect of the active electrode material and the conductivity additive, with a concentration gradient of the active electrode material increasing in the collector direction, and a concentration gradient of the conductivity additive decreasing in the collector direction. The conductivity additive is preferably conductive carbon black.

The collector of the composite electrode of the invention may be coated with only one layer, within which the concentration gradients of the invention are formed. Alternatively, the concentration gradient of the invention may also be formed through a plurality of layers, each having a constant concentration. Moreover, both possibilities may also be linked—for instance, in that a layer having a concentration gradient in respect of at least one of the two gradients of the invention is connected to a plurality of layers having a constant concentration gradient.

The inventors have recognized that using the composite electrode of the invention, it is possible to achieve improved ion conduction and high-current capability in addition to effect adhesion of the electrode composition to the collector.

The binder concentration of the electrode composition in the direction of the electrode thickness is preferably constant.

In one preferred embodiment, the electrode composition, based on volume, possesses a porosity of 5% to 50%, and has a ratio of the porosity in a near-surface layer to the porosity of a layer near to the collector of 1.2 to 5, preferably at 1.5 to 4, more preferably at 1.5 to 2.5. The measurements in this context are determined by Mercury Porosimetry (or Hg porosimetry). A measurement technique of this kind is described for example in Van Brakel, J., S. Modrý, and M. Svata. "Mercury Porosimetry: State of the Art." *Powder Technology* 29.1 (1981): 1-12.

In one preferred embodiment, the conductivity additive, preferably conductive carbon black, is present in the electrode composition in an amount of 1 to 7 wt % and the binder is present in the electrode composition in an amount of 1 to 7 wt %.

In one preferred embodiment, the electrode composition has a ratio of the weight-based amount of conductivity additive, preferably conductive carbon black, in a layer near to the collector to the weight-based amount of the conductivity additive, preferably conductive carbon black, of a near-surface layer of 1.2 to 5, preferably 1.5 to 4, more preferably 1.5 to 2.5.

In one preferred embodiment, the active electrode material is an anode material selected from the group consisting of synthetic graphite, natural graphite, carbon, lithium titanate, and mixtures thereof.

In another preferred embodiment, the active electrode material is a cathode material selected from the group consisting of lithium transition-metal oxide, layered oxides, spinels, olivine compounds, silicate compounds, high-energy NCM, and mixtures thereof.

In one preferred embodiment, the binder is selected from the group consisting of polyvinylidene fluoride, copolymer of polyvinylidene fluoride and hexafluoropropylene, copolymer of styrene and butadiene, cellulose, cellulose derivatives, and mixtures thereof.

The lithium diffusion coefficient of the active electrode material or of a mixture thereof at room temperature (20° C.) is preferably $1.0 \times 10^{-4}$ cm$^2$ s$^{-1}$ to $1.0 \times 10^{-14}$ cm$^2$ s$^{-1}$, more preferably, $1.0 \times 10^{-7}$ cm$^2$ s$^{-1}$ to $1.0 \times 10^{-14}$ cm$^2$ s$^{-1}$. The measurement values in this context are determined by the GITT (Galvanostatic Intermittent Titration Technique), as described for example in W. Weppner and R. A. Huggins, *J. Electrochem. Soc.*, 124, 1569-1578 (1977).

Lithium diffusivity is an intrinsic property of an active electrode material. In the case of using a cathode as the composite electrode, it is possible to set a gradient of the lithium diffusion properties in the direction of the electrode thickness by selecting a suitable active cathode material or by selecting a mixture of two or more active cathode materials, independently of other gradients, such as in the porosity, for instance, by using a different active cathode material in the gradient direction and/or for each layer when using two or more layers. Another possibility is that of using a mixture of the same active cathode materials in each layer, but giving different weight to the proportions of the active cathode materials along the gradient and/or in each layer. These possibilities may also be combined. The same rules apply in the case of using an anode as the composite electrode. The gradient of the lithium diffusivity preferably decreases in the collector direction.

In one aspect, the particle size D50 of the secondary particles of the active electrode material is preferably from 0.05 µm to 50 µm, especially preferably from 2 µm to 30 µm, and/or the particle size of the primary particles of the active electrode material is preferably from 0.001 µm to 50 µm, especially preferably from 0.010 µm to 5 µm. The measurements in this context are determined by scanning electron microscopy (SEM). A measurement technique of this kind is described for example in U.S. Pat. No. 5,872,358.

The number of layers is preferably 1 to a maximum of 20, especially preferred is 3 to 10.

The thickness of the composite electrode without a collector is generally from 5 µm to 250 µm, preferably from 30 µm to 120 µm, more preferably from 40-80 µm. The measurements in this context are determined by optical methods, as specified in U.S. Pat. No. 4,008,523.

In another aspect of the disclosure, the present invention is directed to a lithium-ion battery comprising two electrodes, a separator, and an electrolyte, wherein at least one of the electrodes is a composite electrode according to the present invention.

In another aspect of the disclosure, the present invention is directed to two different methods for producing a composite electrode. Each of these two methods can be used to prepare the composite electrode according to the present invention.

In one embodiment of the invention, the method for producing a composite electrode having a collector, the collector is coated with an electrode composition comprising an active electrode material, a binder, and a conductivity additive, includes the steps of: a) combining at least the active electrode material, the binder in solution with a carrier solvent, and the conductivity additive, preferably conductive carbon black, to form a homogeneous slurry; b) applying the slurry to the collector; c) stripping off the carrier solvent under reduced pressure and/or at elevated temperature, to form a porosity in the slurry; d) adjusting the porosity by calendering, wherein steps a) to d) are repeated at least once, in the course of which in step a) the electrode composition is modified such that the electrode composition has a concentration gradient along the direction of the electrode thickness in respect of the active electrode material and the conductivity additive, with a concentration gradient of the active electrode material increases in the collector direction, and a concentration gradient of the conductivity additive decreases in the collector direction. In one embodiment, the composite electrode has layers of electrode materials that are deposited onto one another by tape casting and in this way the gradient according to the present invention is produced, and the layers are then joined to one another by means of heat and pressure.

In another embodiment of the invention, the method for producing a composite electrode having a collector, the collector is coated with an electrode composition comprising an active electrode material, a binder, and a conductivity additive, including the steps of: a) combining at least the active electrode material, the binder in solution with a solvent, and the conductivity additive, preferably conductive carbon black, to form a homogeneous slurry; b) applying the slurry to the collector; c) stripping off the solvent under reduced pressure and/or at elevated temperature, to form a porosity in the slurry; d) adjusting the porosity by calendering, wherein the electrode composition is modified in step b) by adjusting and utilizing the different densities of the electrode material by means of ascending or descending in the slurry, or by utilizing diffusion in the solvent, such that the electrode composition has a gradient concentration along the direction of the electrode thickness in respect of the active electrode material and the conductivity additive, with a concentration gradient of the active electrode material increases in the collector direction, and a concentration gradient of the conductivity additive decreases in the collector direction.

WORKING EXAMPLES

Cell construction principle for all examples:
Anode: 1% SBR, 2% CMC, 1% Super C45, 96% Hitachi MAG D20.
Cathode: 4% PVdF Solef® 5130 (from Solvay); 4% Super C45 (from Timcal); 92% NMC111 (from BASF, HED).
Separator: 25 μm Celgard® 2325. Electrolyte 1 M LiPF$_6$ in EC:DEC (3:7 v/v). 115 μm packaging with composite aluminum foil from Showa (Japan).
Anode area: 9.7*7 cm$^2$; cathode area 9.3*6.6 cm$^2$.

Example 1

Areal weight (AW) anode: 7.0 mg/cm$^2$. AW cathode: 14.0 mg/cm$^2$. The electrode does not have a graduated design.

Example 2

Areal weight (AW) anode: 17.5 mg/cm$^2$. AW cathode: 35.0 mg/cm$^2$. The electrode does not have a graduated design.

Example 3

Areal weight (AW) anode: 17.5 mg/cm$^2$. AW cathode: 35.0 mg/cm$^2$. Both electrodes have a graduated design according to the invention.

In this Example, within the cathode, the concentration of conductive carbon black increases from the collector side to the electrode surface from 2-6 percent by weight, and the concentration of the electrode binder increases from 2-6 percent by weight. The concentration of the active material is 94 (current collector) –90 percent by weight (cathode surface). Porosity 30 (current collector side) –36 (cathode surface) percent by volume.

Within the anode, the concentration of conductive carbon black increases from the collector side to the electrode surface from 0.5-1.5 percent by weight, and the concentration of the two electrode binders, CMC and SBR, is 2-4 percent by weight. The concentration of the active material is 97 (current collector) –95 percent by weight (anode surface). Porosity 30 (current collector side) –36 (anode surface) percent by volume.

Results of the long-term cycling tests at 1C (CCCV)/1C (CC) under room-temperature conditions:

TABLE 1

| Cell example | Number of full cycles until 80% residual capacity is reached | Notes |
| --- | --- | --- |
| 1 | 500 | Electrodes charged to low level with nongraduated design. |
| 2 | 300 | Highly charged electrodes with nongraduated design. |
| 3 | 500 | Highly charged electrodes with graduated design according to the invention. |

Result of Long-Term Cycling:
The cells with the highly charged electrodes in accordance with a graduated construction according to the present invention exhibit cycling results identical to those of the cells with electrodes charged to a low level. Both cell types, accordingly, also have better cycling stability than cells with highly charged electrodes according to the non-graduated design.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A composite electrode comprising:
a collector, the collector is coated with an electrode composition comprising an active electrode material, a binder, and a conductivity additive,
wherein the electrode composition has a concentration gradient along the direction of the electrode thickness in respect of the active electrode material, the binder, and the conductivity additive, wherein a concentration gradient of the active electrode material increases in the collector direction, and a concentration gradient of the conductivity additive and a concentration gradient of the binder decreases in the collector direction,
wherein the active electrode material has a lithium diffusion coefficient, and wherein the electrode composition has a gradient of the lithium diffusivity along the direction of the electrode thickness and the gradient of the lithium diffusivity decreases in the collector direction, and
wherein the binder is present in the electrode composition in an amount of at most 4 wt %.
2. The composite electrode according to claim 1, wherein the electrode composition, based on volume, possesses a porosity of 5% to 50%, and has a ratio of the porosity in a near-surface layer to the porosity of a layer near to the collector of 1.2 to 5.
3. The composite electrode according to claim 2, wherein the electrode composition has a ratio of the porosity in a near-surface layer to the porosity of a layer near to the collector of 1.5 to 4.

4. The composite electrode according to claim 2, wherein the electrode composition has a ratio of the porosity in a near-surface layer to the porosity of a layer near to the collector of 1.5 to 2.5.

5. The composite electrode according to claim 1, wherein the conductivity additive is present in the electrode composition in an amount of 1 to 4 wt %.

6. The composite electrode according to claim 1, wherein the conductivity additive is conductive carbon black.

7. The composite electrode according to claim 1, wherein the electrode composition has a ratio of the weight-based amount of conductivity additive in a layer near to the collector to the weight-based amount of the conductivity additive of a near-surface layer of 1.2 to 5.

8. The composite electrode according to claim 1, wherein the electrode composition has a ratio of the weight-based amount of conductivity additive in a layer near to the collector to the weight-based amount of the conductivity additive of a near-surface layer of 1.5 to 4.

9. The composite electrode according to claim 1, wherein the electrode composition has a ratio of the weight-based amount conductivity additive in a layer near to the collector to the weight-based amount of the conductivity additive of a near-surface layer of 1.5 to 2.5.

10. The composite electrode according to claim 1, wherein the active electrode material is an anode material selected from the group consisting of synthetic graphite, natural graphite, carbon, lithium titanate, and mixtures thereof.

11. The composite electrode according to claim 1, wherein the active electrode material is a cathode material selected from the group consisting of lithium transition-metal oxide, layered oxides, spinels, olivine compounds, silicate compounds, high-energy NCM, and mixtures thereof.

12. The composite electrode according to claim 1, wherein the binder is selected from the group consisting of polyvinylidene fluoride, copolymer of polyvinylidene fluoride and hexafluoropropylene, copolymer of styrene and butadiene, cellulose, cellulose derivatives, and mixtures thereof.

13. The composite electrode according to claim 1, wherein the lithium diffusion coefficient of the active electrode material or of a mixture thereof at room temperature 20° C. is from $1.0 \times 10^{-4}$ cm$^2$ s$^{-1}$ to $1.0 \times 10^{-14}$ cm$^2$ s$^{-1}$.

* * * * *